Aug. 3, 1943.　　　J. T. LITTLETON　　　2,326,044
GLASS FORMING APPARATUS
Filed July 20, 1940
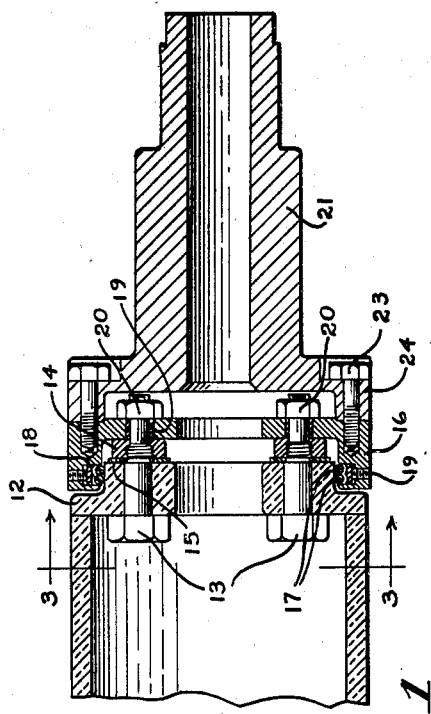
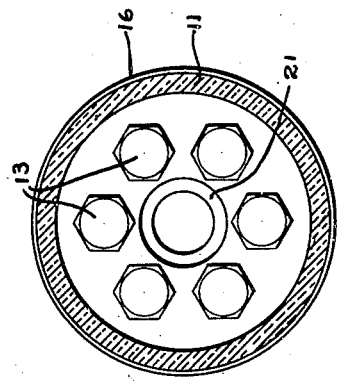
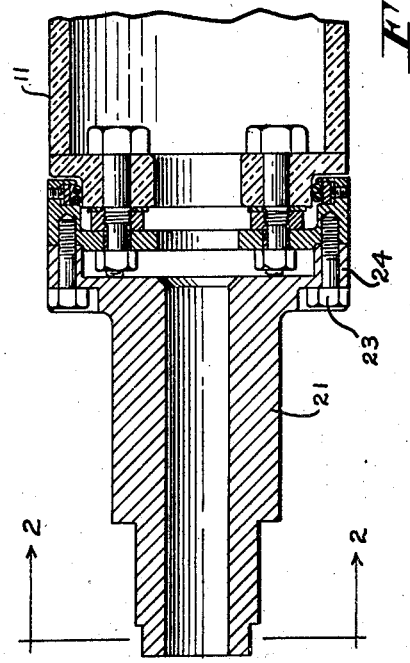
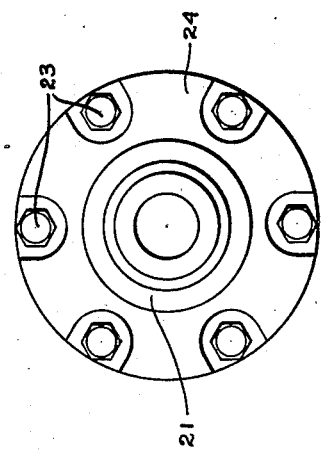
INVENTOR.
JESSE T. LITTLETON
BY
ATTORNEY.

Patented Aug. 3, 1943

2,326,044

UNITED STATES PATENT OFFICE 2,326,044

GLASS FORMING APPARATUS

Jesse T. Littleton, Corning, N. Y., assignor to Corning Glass Works, Corning, N. Y., a corporation of New York Application July 20, 1940, Serial No. 346,616

3 Claims. (Cl. 49—33)

My invention relates to improved equipment suitable for use in forming glass and is herein illustrated and described as applied in the manufacture of sheet glass by the rolling process. In all prior apparatus with which I am familiar wherein glass sheets are formed by the rolling process it has been customary to employ metal or ceramic refractory forming rolls. The chief objection to known forms of ceramic refractory rolls is that they are porous and composed of granules of widely varying degrees of hardness. Such a material will not take the highly polished finish it is desired to impart to the glass, thus making a separate polishing or surface finishing of the glass necessary. On the other hand, it is readily possible to highly polish metal rolls but, owing to their high heat conductivity, they tend to chill the surface of the glass too rapidly, thereby developing wrinkles or chill marks in the surface layer of the glass, also making a separate polishing or finishing of the glass necessary. If, on the other hand, the rolls are operated at a high enough temperature to prevent excessive chilling of the glass surface, the glass will stick to the rolls. Then too, the coefficient of expansion of metals suitable for use in rolls is so great that objectional deformation of the rolls occurs, making it difficult if not impossible to produce a sheet of glass which is perfectly flat and of uniform thickness throughout its width.

I have discovered that a material having a low thermal expansion characteristic, a high softening temperature, and a low thermal conductivity is an ideal material for glass forming implements, because it does not warp to any appreciable extent within relatively wide temperature variations, and can be given the high polish it is desired to impart to the glass being formed and, owing to its low thermal conductivity, actually imparts a high polish finish to the glass. A material such as glass having a high silica content is ideally suited to this use because it has a high softening temperature, is of low thermal conductivity and has a low coefficient of expansion. For example, one such glass has a silica content of over 95%, a softening temperature of over 1500° C. and a thermal coefficient of expansion of .0₆8 per degree centigrade, but of course when the glass or plastic to be formed has a relatively low working temperature, that used in the forming implements need not have the above qualities. For example, a glass having a softening temperature of 900° C. and a thermal coefficient of expansion of .0₅3 per degree centigrade may be quite satisfactory.

The prime object of my invention is a non-metallic forming implement capable of taking as high a polish as does metal.

Another object is a forming implement whose coefficient of expansion is very low compared to metal and even lower than the coefficient of expansion of refractories heretofore available for such use.

A still further object is a forming implement of low heat conductivity compared to metal.

Other objects of my invention will become apparent from a further perusal of this specification and its accompanying drawing wherein Fig. 1 is a sectional view of a glass rolling apparatus embodying my invention;

Fig. 2 is an end elevation of Fig. 1 as viewed from line 2—2 thereof; and

Fig. 3 is a view taken on line 3—3 of Fig. 1.

In the drawing the forming implement is shown as a roll comprising a cylinder 11 of a wall thickness and diameter determined by the character and thickness of the glass sheet to be rolled, and as previously stated is composed of glass having a very high silica content. This cylinder has perforated end hub members 12 which may be formed integral with the cylinder or, if desired, may be formed separately and afterwards welded to the cylinder ends. A mounting bolt 13 is passed through each aperture of the hub member and is rigidly held in position by a nut 14 with suitable cushioning gaskets 15. The free ends of bolts 13 are passed through suitable apertures in a flanged roll supporting plate 16, such plate having a groove on the inner surface of its flange containing packing cords 17 surrounded by a split ring 18 of soft copper. A number of set screws 19 are provided to force the split ring 18 to exert pressure on the packing cords in such a manner as to centrally space the hub from the inner surface of the flange of plate 16. The space in each aperture in plate 16 surrounding a bolt 13 is then filled with babbitt 19 and the plate rigidly secured to the hub 12 by nuts 20.

The roll assembly as above described is held between suitable roll supporting members 21 by cap screws 23 passing through flanges 24 of such members and threaded into the roll supporting plates 16.

As will be clearly evident if desired, cooling of the roll may readily be effected by passing a cooling medium through the interior of the roll by way of the bores of members 21 and 22.

Although I have herein shown and described apparatus embodying my invention as applied to sheet glass rolling apparatus, it is to be understood that it may also be applied to other types of glass forming apparatus falling within the scope of the appended claims without departing from the spirit and scope of my invention.

I claim:

1. In a glass forming apparatus, a glass forming implement composed of a hollow cylinder of low expansion glass, end members partly closing the ends of the cylinder and having apertures therethrough, an apertured and flanged plate adjacent each end of the cylinder arranged with apertures in alignment with the cylinder end apertures, bolts passing through the apertures and clamping the plates to the cylinder with the plate flanges surrounding the end members, means arranged between the flanges and the end members to axially align said plates with the cylinder and axles attached to said plates.

2. In a glass forming apparatus, a hollow glass shaping cylinder of low expansion glass having an integral end portion with apertures therethrough parallel to the axis of the cylinder, an apertured plate adjacent said end portion arranged with its apertures in alignment with the apertures of said end portion and having a flange integral therewith overlapping said end portion, bolts passing through the aligned apertures and clamping said plate fixed to, but in spaced relation from said end portion, sealing means intermediate said flange and end member and an axle attached to said plate.

3. In a forming roll assembly, a hollow cylinder having end members integral therewith each with a fluid passage therethrough coextensive with the axis of the cylinder and each also having clamping means receiving apertures therethrough, apertured axle coupling members each aligned adjacent to but spaced from an end member with apertures therethrough aligned with those of the adjacent end member and each also having a fluid passage therethrough in alignment with the fluid passage through the adjacent end member, means passing through the apertures of adjacent end and coupling members clamping them to one another, means attached to each coupling member comprising a tubular axle whose bore is in communication with the passage of the associated coupling member and resilient means sealing the spaces between the respective end and coupling members.

JESSE T. LITTLETON.